(No Model.)

J. W. WHITTIC.
OVERDRAW CHECK FOR BRIDLES.

No. 333,581. Patented Jan. 5, 1886.

WITNESSES.
Wm N. A. Brownell
A. T. Smith

INVENTOR.
John W. Whittic

UNITED STATES PATENT OFFICE.

JOHN W. WHITTIC, OF SYRACUSE, NEW YORK.

OVERDRAW-CHECK FOR BRIDLES.

SPECIFICATION forming part of Letters Patent No. 333,581, dated January 5, 1886.

Application filed March 5, 1885. Serial No. 157,808. (No model.)

*To all whom it may concern:*

Be it known that I, JOHN W. WHITTIC, of Syracuse, in the county of Onondaga, in the State of New York, have invented new and useful Improvements in Overdraw-Checks for Harness-Bridles, of which the following, taken in connection with the accompanying drawings, is a full, clear, and exact description.

This invention relates to improvements in what are known as "overdraw" or "Jackson" checks, and has for its object the production of a simple and effective device for obviating the tendency of the check-reins to rub off and destroy the foretop of the horse, consequent to the movement of the head against the pull of the check. Experience has shown that while the so-called "overdraw" or "Jackson" check is very desirable and efficient in controlling the carriage of the horse's head and productive of stylish action, yet the check devices as heretofore made unavoidably destroyed the foretop by the constant rubbing of the check-rein over the head, and this undue friction developed sores on the head, causing the animal to become restive.

To overcome this difficulty my invention is designed; and to this end it consists of elongated curved box-loops secured to the crown-strap of the harness-bridle and arranged on the forehead of the animal, between the ears, in position to receive the two ends of the overdraw check-rein, while said ends are passed through the loops and the loops wholly inclosed or housed, that portion of the check-rein which passes through the animal's foretop serving as a guide for each side of the rein, and permitting the free movement of the rein without coming in contact with the foretop, as more fully described hereinafter.

In specifying my invention reference is had to the accompanying drawings, like letters indicating corresponding parts, in which—

Figure 2:
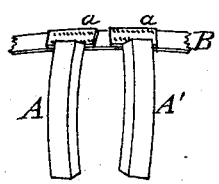
Figure 1:
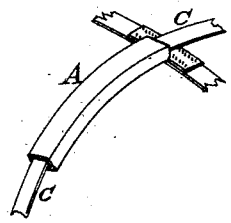
Figure 3:

Figure 1 is a view of the elongated curved box-loops detached. Fig. 2 shows the loops attached in proper operative position to the crown-strap. Fig. 3 is a cross-section of the loop, and Fig. 4 shows an overdraw-check containing my invention applied to the animal as in practice.

The letter A represents the elongated box-loop, which, as shown, is constructed of leather, although any other suitable material will answer. It is curved to conform to the shape of the horse's head, from the crown over the forehead, and of sufficient length—usually about six inches—to clear the foretop. Two of the loops are secured to the crown-strap B, as shown in Fig. 2, by stitching or riveting through the extensions *a a* into the crown-strap B. The loops A A' are arranged on the crown-strap in position to lie over the forehead of the animal, between the ears, as shown in Fig. 4, to receive both ends *c c'* of the check-rein C, to guide the rein clear of the foretop. The curved elongated loops A A' are shaped in cross-section as best shown at Fig. 3, and are made of suitable dimensions to allow the check-rein to pass freely through the box of the loop. The loops A A' are inclosed by the box, which extends from end to end, and the bottom of the loop lies on the animal's head, and the check-rein necessarily is guided free of the head, and cannot come in contact with or rub the foretop.

Figure 4:
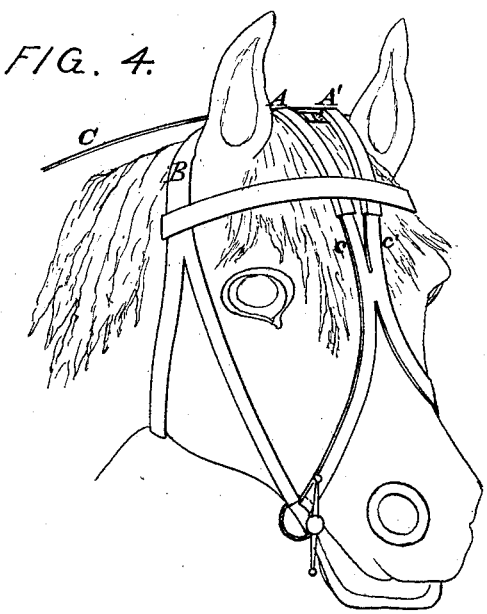

In using my improvement the check-rein is constructed in two parts, *c c'*, as shown in Fig. 4, and it is essential to arrange the loops, crown-strap, and check-rein in the manner described, and shown in Fig. 4, to prevent the rein from rubbing the foretop, and it will be observed that the device effectually accomplishes the desired result.

I am aware of the patent granted to H. E. Fowler, September 9, 1879. The device therein described consists simply of a curved metallic guide-piece, with keepers arranged equidistant thereon, through which passes a single-rein overdraw-check. There is no provision in this device to keep the rein from rubbing off the foretop, and, indeed, it is not designed for this purpose, as the rein is simply guided centrally by the device. This differs essentially from my invention, in that in my invention the check-reins are guided directly over the animal's forehead through inclosed guiding-loops on each side thereof, combined with the crown-strap and the two-part check-rein, and in that the same is designed expressly for and does effectually prevent the rubbing off of the foretop, while in Fowler's device the guide-plate is elevated from the crown and forehead, and simply guides the check-rein.

Having thus fully described my invention, what I claim as new, and desire to secure by Letters Patent, is—

The combination, in an overdraw-check, of the curved elongated box-loops A A', connected rigidly to the bridle crown-piece B, with said crown-piece B and the two-part check-rein $c\ c'$, all substantially as and for the purpose specified.

In testimony whereof I have hereunto signed my name and affixed my seal, in the presence of two attesting witnesses, at Syracuse, in the county of Onondaga, in the State of New York, this 3d day of March, 1885.

JOHN W. WHITTIC. [L. S.]

Witnesses:
WM. N. A. BROWNELL,
A. T. SMITH.